2,779,685
METHOD OF MANUFACTURING A PHOTO-CATHODE SCREEN ASSEMBLY FOR AN IMAGE AMPLIFIER

Marten Cornelis Teves, Taeke Tol and Petrus Cornelis Van der Linden, Eindhoven, Netherlands, assignors to Hartford National Bank and Trust Company, Hartford, Conn., as trustee No Drawing. Original application December 26, 1951, Serial No. 263,228, now Patent No. 2,698,912, dated January 4, 1955. Divided and this application March 13, 1953, Serial No. 342,298

Claims priority, application Netherlands January 17, 1951

8 Claims. (Cl. 117—33.5)

This invention relates to a method of manufacturing a photocathode screen assembly for an electron-optical image amplifier for producing an amplified image of an image produced on a fluorescent screen, in particular for an X-ray image amplifier, and forms a division of our co-pending application Serial No. 263,228, filed December 26, 1951, now Patent No. 2,698,912.

More specifically the invention relates to a method of manufacturing a photocathode screen assembly comprising a primary screen arranged in close proximity to a photo-electric cathode so that no optical projection means are required to reproduce the image on the photocathode. The luminescent layer forming the fluorescent screen on which the image is produced must be responsive to radiation to which the photocathode is substantially unresponsive and must be capable of absorbing enough radiation that its light output is sufficient to release a sufficient quantity of electrons from the photocathode to produce a satisfactory reproduced image on a collector screen. The layer must, in addition, co-operate with the cathode in such manner that there is no loss of detail in the resulting image reproduced on the collecting screen.

The light output of a luminescent screen excited by X-radiation increases with the intensity of the radiation striking the screen. However, as the thickness of the luminescent layer increases the light output of the layer is restricted by the absorption of light in the layer itself with a consequent decrease in the sharpness of the image. The optimum layer thickness for obtaining satisfactory light output and image clarity has been determined to be between 0.2 and 0.7 mm. depending upon the granular size of the luminescent substance and the mean hardness of the radiation.

It is the main object of this invention to provide a photocathode screen assembly in which maximum light output from the luminescent layer is obtained which may be reproduced as an amplified image on a collector screen in a suitable image amplifier.

According to the invention, the method of manufacturing a photocathode screen assembly for an image amplifier comprises the steps of applying a suspension of a luminescent material in a silicone to one surface of a support which is relatively pervious to radiation, heating the suspension to a temperature of about 200° C. for about eight hours to polymerise the silicone, applying a conductive metal layer to the surface of the silicone suspension and applying a photoelectric layer over said conductive metal layer.

The luminescent layer is formed by casting the required quantity of a suspension of a suitable luminescent substance, for example, zinc sulfide or a mixture of zinc sulfide and cadmium sulfide in silicone on a support. If the assembly is adapted for use in an X-ray image amplifier the support may consist of a metal of low atomic number which is relatively pervious to X-radiation. A suitable metal is, for example, aluminum or beryllium.

The mixture ratio in the suspension is such that the interstices between grains of the luminescent substance are completely filled with silicone, so that a smooth surface is formed. There is no objection against adding a slightly greater quantity of silicone to the mixture, so that, after the luminescent substance has settled, a layer of pure silicone is formed thereon. The screen is then heated for about 8 hours up to about 200° C. during which time the silicone polymerizes. Upon cooling it forms a layer having a perfectly smooth surface. The photo-electric cathode is applied to this layer.

The photo-electric cathode may be manufactured from silver-activated caesium oxide or from a compound of antimony with caesium oxide and is applied to a thin, good conductive layer preferably of chromium or iridium. A layer of a few Angstroms in thickness is sufficiently conductive, but for such small thickness there is a risk that the caesium will penetrate through the layer and contact with the substratum of silicone. In order to avoid corrosion of this layer by caesium, it is advisable to apply a thin layer of alumina prior to the application of the conductive film. This alumina layer, having a thickness of about 20 to 30 A. is practically transparent. The application may be carried out by vaporising aluminum in vacuo, subsequent to which the material completely oxidizes to form $Al_2O_3$ in air. Subsequent to mounting the screen in the tube and exhausting it at higher temperature, the conductive layer, which may be 5 to 10 A. in thickness and be made of chromium or iridium, is applied by vaporisation to the oxide layer thus formed. The light absorption in this layer is less than 5%. Then a quantity of antimony is evaporated in the tube and precipitated on the screen and caesium vapour is introduced, forming with the antimony a photosensitive compound.

When using the cathode assembly in an image amplifier the image producing rays impinge upon the luminescent layer of the photocathode screen. The luminescence produced by this radiation illuminates the photocathode, which consequently emits electrons. These electrons are accelerated and conveyed under the action of the field distribution in the tube or the collecting screen. There the amplified fluoroscopic image is produced.

In order to improve a favourable field distribution in the tube, which favours the concord between the image produced on the primary screen and the fluorescent image on the collecting screen, it is often desirable that the photo-cathode screen is curved. It has been found to be a further advantage of the invention that the curvature of the photo-cathode assembly manufactured in accordance with the invention for obtaining the desired shape be effected prior to the application of the photo-electric cathode. If binders usually employed for thin screens are used, this operation inevitably gives rise to cracks in the luminescent layer, so that the screen becomes unserviceable.

While the invention has been described in connection with a specific embodiment, other modifications thereof will be readily apparent to one skilled in the art without departing from the spirit and scope of the invention as defined in the appended claims.

What is claimed is:

1. A method of manufacturing a photocathode screen assembly for an image amplifier comprising the steps of applying a suspension of a fluorescent material in a silicone to one surface of a support of a metal of low atomic number which is relatively pervious to image producing radiation, heating the suspension to a temperature of about 200° C. for about eight hours to polymerize the silicone to form a smooth surface thereon, applying to the smooth surface of the silicone suspension a con- -ductive metal layer which is highly pervious to fluorescent luminescence, and applying a photoelectric layer over said conductive metal layer.

2. A method of manufacturing a photocathode screen assembly for an X-ray image amplifier comprising the steps of applying a suspension of a fluorescent material in a silicone to one surface of a support of a metal of low atomic number which is relatively pervious to X-radiation, settling the fluorescent material in the silicone, heating the silicone to a temperature of about 200° C. for about eight hours to polymerize the silicone to form a smooth surface thereon, applying a conductive metal layer which is highly permeable to fluorescent luminescence to the smooth surface of the silicone, and applying a photo-electric layer over said conductive metal layer.

3. A method of manufacturing a photocathode screen assembly for an X-ray image amplifier comprising the steps of applying a suspension of a fluorescent material in a sufficient amount of silicone to one surface of a support of a metal of low atomic number which is relatively pervious to X-radiation that upon settling the fluorescent material in the silicone a layer of pure silicone is formed thereon, heating the silicone to a temperature of about 200° C. for about eight hours to polymerize the silicone to form a smooth surface thereon, applying a thin conductive substantially light-transparent metal layer to the smooth surface of the silicone, and applying a photo-electric layer over said conductive metal layer.

4. A method of manufacturing a photocathode screen assembly for an X-ray image amplifier comprising the steps of applying a suspension of a material selected from the group consisting of zinc sulfide and a mixture of zinc and cadmium sulfides in a silicone to one surface of a support of a metal of low atomic number which is relatively pervious to X-radiation, settling the sulfide in the silicone, heating the silicone to a temperature of about 200° C. for about eight hours to polymerize the silicone to form a smooth surface thereon, applying a thin conductive substantially light-transparent metal layer to the smooth surface of the silicone, and applying a photo-electric layer over said conductive metal layer.

5. A method of manufacturing a photocathode screen assembly for an X-ray image amplifier comprising the steps of applying a suspension of a luminescent material in a silicone to one surface of a support of a metal of low atomic number which is relatively pervious to X-radiation, settling the fluorescent material in the silicone, heating the silicone to a temperature of about 200° C. for about eight hours to polymerize the silicone to form a smooth surface thereon, applying a thin layer of alumina to one surface of the silicone, applying a conductive substantially light-transparent metal layer on the alumina layer, and applying a photo-electric layer over said conductive metal layer.

6. A method of manufacturing a photocathode screen assembly for an X-ray image amplifier comprising the steps of applying a suspension of a fluorescent material in a silicone to one surface of an aluminum support, settling the fluorescent material in the silicone, heating the silicone to a temperature of about 200° C. for about eight hours to polymerize the silicone to form a smooth surface thereon, applying a thin layer of alumina to one surface of the silicone, applying a thin layer of chromium over the alumina, and applying a photo-electric layer over said chromium layer.

7. A method of manufacturing a photocathode screen assembly for an X-ray image amplifier comprising the steps of applying a suspension of a fluorescent material in a silicone to one surface of a thin beryllium support, settling the fluorescent material in the silicone, heating the silicone to a temperature of about 200° C. for about eight hours to polymerize the silicone to form a smooth surface thereon, applying a thin layer of alumina over one surface of the silicone, applying a thin layer of iridium over the alumina layer, and applying a photo-electric layer over said iridium layer.

8. A method of manufacturing a photocathode screen assembly for an X-ray image amplifier comprising the steps of applying a suspension of a fluorescent material in a silicone to one surface of a support of a metal of low atomic number which is relatively pervious to X-radiation, heating the suspension to a temperature of about 200° C. for about eight hours to polymerize the silicone to form a smooth surface thereon, applying a conductive metal layer of 5 to 10 A. in thickness to the smooth surface of the silicone suspension, and applying a photo-electric layer over said conductive metal layer.

References Cited in the file of this patent

UNITED STATES PATENTS

| | | |
|---|---|---|
| 2,060,977 | De Boer et al. | Nov. 17, 1936 |
| 2,243,108 | Lubszynski et al. | May 27, 1941 |
| 2,257,827 | Weissenberg | Oct. 7, 1941 |
| 2,423,626 | Szegho | July 8, 1947 |
| 2,451,590 | Tidik et al. | Oct. 19, 1948 |
| 2,523,132 | Mason et al. | Sept. 19, 1950 |
| 2,698,912 | Teves et al. | Jan. 4, 1955 |